United States Patent
Wagner

(10) Patent No.: US 9,534,684 B2
(45) Date of Patent: Jan. 3, 2017

(54) SHIFT DEVICE HAVING ROTATIONAL FREE TRAVEL FOR THE SHIFT SHAFT, AND MOTOR VEHICLE TRANSMISSION HAVING SUCH SHIFT DEVICE

(71) Applicant: Audi AG, Ingolstadt (DE)

(72) Inventor: Rupert Wagner, Kühbach (DE)

(73) Assignee: AUDI AG, Ingolstadt (DE)

( * ) Notice: Subject to any disclaimer, the term of this patent is extended or adjusted under 35 U.S.C. 154(b) by 180 days.

(21) Appl. No.: 14/363,222

(22) PCT Filed: Dec. 6, 2012

(86) PCT No.: PCT/EP2012/005039
§ 371 (c)(1),
(2) Date: Jun. 5, 2014

(87) PCT Pub. No.: WO2013/087170
PCT Pub. Date: Jun. 20, 2013

(65) Prior Publication Data
US 2015/0040710 A1   Feb. 12, 2015

(30) Foreign Application Priority Data
Dec. 16, 2011   (DE) .......... 10 2011 121 481

(51) Int. Cl.
*F16H 59/10*   (2006.01)
*F16D 3/10*    (2006.01)
(Continued)

(52) U.S. Cl.
CPC ............ *F16H 59/105* (2013.01); *F16D 3/10* (2013.01); *F16D 2001/103* (2013.01);
(Continued)

(58) Field of Classification Search
CPC .... F16H 59/105; F16D 2001/103; F16D 3/10; F16D 3/02; F16D 3/06; Y10T 403/7026; Y10T 74/2014
(Continued)

(56) References Cited

U.S. PATENT DOCUMENTS

| 831,386 | A |   | 9/1906 | Simmons |   |
|---|---|---|---|---|---|
| 2,394,405 | A | * | 2/1946 | Schjolin | B60K 17/22 464/89 |

(Continued)

FOREIGN PATENT DOCUMENTS

| DE | 38 33 757 | 4/1990 |
|---|---|---|
| DE | 38 33 758 | 4/1990 |

(Continued)

OTHER PUBLICATIONS

Chinese Search Report issued on Nov. 2, 2015 with respect to counterpart Chinese patent application 201280062278.0.
(Continued)

*Primary Examiner* — William Kelleher
*Assistant Examiner* — Leonard J Archuleta
(74) *Attorney, Agent, or Firm* — Henry M. Feiereisen LLC.

(57) ABSTRACT

A shift device for a motor vehicle transmission, in particular for a motor vehicle automatic transmission, includes a shift shaft operatively connected to the transmission and a shift lever for actuating the shift shaft, wherein the shift shaft and the shift lever are connected to one another by way of a spline connection. The spline connection is formed with rotational play, permitting a restricted rotational free travel of the shift shaft when the shift lever is stationary. A motor vehicle transmission having a shift device of this type is also disclosed.

11 Claims, 3 Drawing Sheets

(51) Int. Cl.
*F16H 61/36* (2006.01)
*F16H 61/32* (2006.01)
*F16D 1/10* (2006.01)

(52) U.S. Cl.
CPC ........ *F16H 61/36* (2013.01); *F16H 2061/326* (2013.01); *Y10T 74/2014* (2015.01)

(58) Field of Classification Search
USPC .............................. 74/473.3, 473.21, 473.25, 473.26,74/473.28, 473.36; 403/359.1, 359.6, 359.4; 464/160; 192/70.2
See application file for complete search history.

(56) References Cited

U.S. PATENT DOCUMENTS

| | | | | |
|---|---|---|---|---|
| 4,098,381 | A * | 7/1978 | Mueller | F16D 23/08 192/108 |
| 4,772,245 | A * | 9/1988 | Readman | F16D 3/76 464/160 |
| 4,819,961 | A | 4/1989 | Henigue | |
| 4,932,809 | A * | 6/1990 | Kopp | F16D 3/02 403/1 |
| 5,029,914 | A | 7/1991 | Hankel | |
| 5,076,112 | A * | 12/1991 | Williams | B60K 17/344 74/337.5 |
| 5,086,896 | A * | 2/1992 | Murakami | F16D 11/12 192/107 T |
| 5,159,847 | A * | 11/1992 | Williams | B60K 17/344 180/247 |
| 5,651,749 | A * | 7/1997 | Wilson | B60K 17/3462 180/247 |
| 5,653,321 | A * | 8/1997 | Takaoka | F16D 13/648 188/71.5 |
| 5,713,243 | A * | 2/1998 | Williams | B60K 23/08 74/337.5 |
| 5,827,122 | A * | 10/1998 | Kurian | F16C 3/03 403/359.6 |
| 5,949,344 | A | 9/1999 | Yasuda et al. | |
| 6,378,647 | B1 * | 4/2002 | Birsching | B62D 5/0409 180/444 |
| 7,004,875 | B2 * | 2/2006 | Williams | B60K 23/08 192/38 |
| 7,314,416 | B2 * | 1/2008 | Loughrin | F16D 3/06 464/160 |
| 2003/0066369 | A1 | 4/2003 | Benda | |
| 2005/0016311 | A1 | 1/2005 | Netzker et al. | |
| 2006/0223640 | A1 * | 10/2006 | Bassett | F16D 3/02 464/30 |
| 2008/0214348 | A1 * | 9/2008 | Hasegawa | F16H 37/043 475/80 |
| 2013/0263684 | A1 * | 10/2013 | McCloy | B60K 17/344 74/473.36 |
| 2014/0147197 | A1 * | 5/2014 | Yoshida | B62D 1/20 403/359.1 |

FOREIGN PATENT DOCUMENTS

| | | |
|---|---|---|
| DE | 196 04 885 | 8/1997 |
| DE | 199 01 813 | 7/2000 |
| DE | 100 40 077 C2 | 3/2002 |
| DE | 102 36 541 | 3/2003 |
| DE | 102006000855 | 7/2007 |
| DE | 102008054965 | 7/2010 |
| EP | 0 281 442 | 9/1988 |
| EP | 1 482 213 | 12/2004 |
| EP | 2 023 020 | 2/2009 |

OTHER PUBLICATIONS

Translation of Chinese Search Report issued on Nov. 2, 2015 with respect to counterpart Chinese patent application 201280062278.0.
International Search Report issued by the European Patent Office in International Application PCT/EP2012/005039 on Apr. 30, 2013.

* cited by examiner

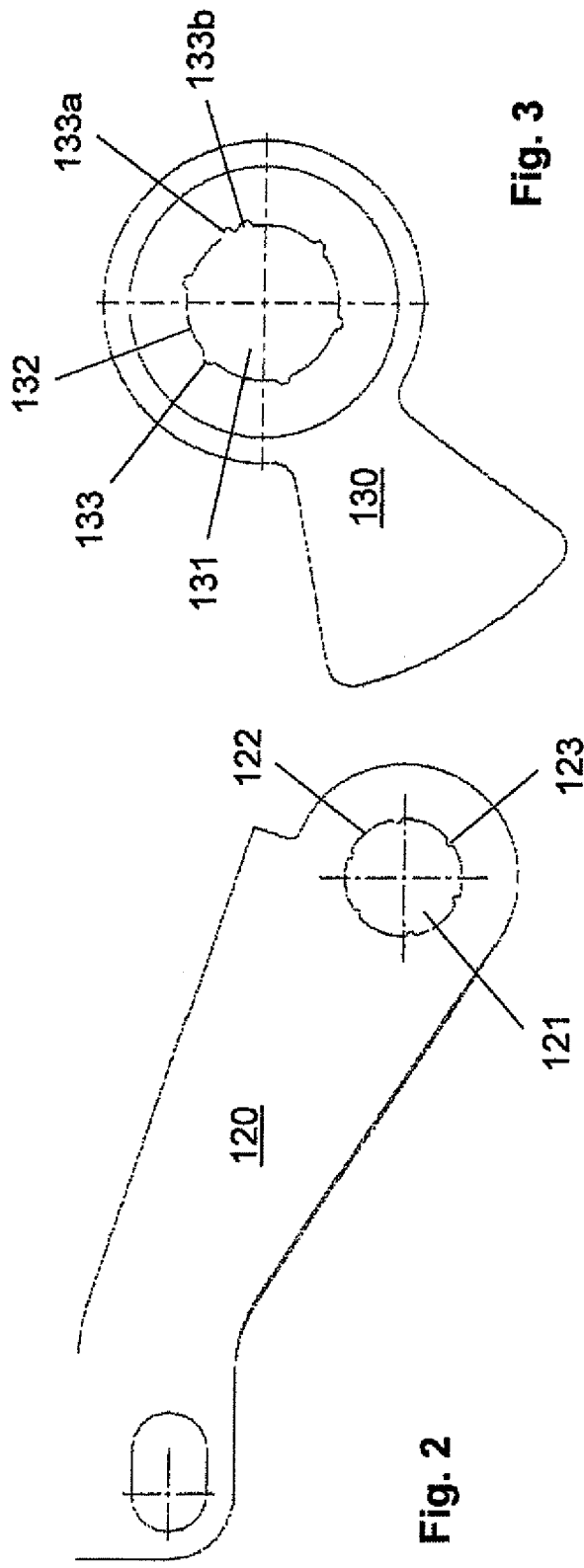

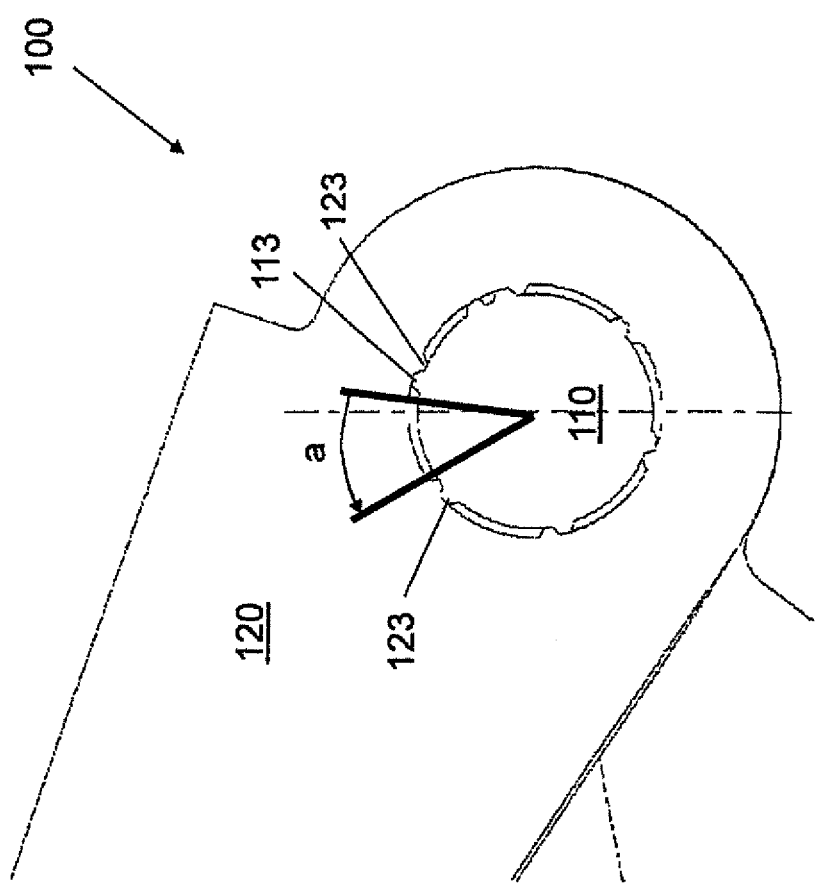

SHIFT DEVICE HAVING ROTATIONAL FREE TRAVEL FOR THE SHIFT SHAFT, AND MOTOR VEHICLE TRANSMISSION HAVING SUCH SHIFT DEVICE

CROSS-REFERENCES TO RELATED APPLICATIONS

This application is the U.S. National Stage of International Application No. PCT/EP2012/005039, filed Dec. 6, 2012, which designated the United States and has been published as International Publication No. WO 2013/087170 and which claims the priority of German Patent Application, Serial No. 10 2011 121 481.3, filed Dec. 16, 2011, pursuant to 35 U.S.C. 119(a)-(d).

BACKGROUND OF THE INVENTION

The invention relates to a shift device for a motor vehicle transmission, in particular for an automatic transmission of a motor vehicle, with a shift shaft leading to the transmission and with a shift lever for operating the shift shaft, wherein the shift shaft and the shift lever are connected to each other by a spline connection.

The invention further relates to a motor vehicle transmission, in particular an automatic transmission for a motor vehicle equipped with a shift device of this type.

It is necessary in certain operating situations of modern automotive transmissions, such as in shift-by-wire transmissions (as will be explained in more detail below) that the shift shaft can rotate relative to a stationary shift lever, in spite of the basically rotationally fixed connection.

SUMMARY OF THE INVENTION

It is the object of the invention to provide a shift device of the aforementioned type which is able to satisfy the given requirements at low cost.

The object is attained with a shift device according to the invention for a motor vehicle transmission, in particular for an automatic transmission of a motor vehicle, with a shift shaft leading to the transmission and a shift lever for operating the shift shaft, wherein the shift shaft and the shift lever are connected with one another by a spline connection. According to the invention, the spline connection is constructed with rotational play and has rotational play, respectively, thus allowing limited or limited rotation free travel the shift shaft while the shift lever is stationary.

The rotational free travel or the rotational free travel facilitated by the rotational play or free travel in the spline connection enables, on the one hand, a relative rotation of shift shaft and shift lever about a maximum rotation angle predetermined by the structure (free travel function). However, on the other hand, a rotation of the shift shaft by way of the shift lever and/or vice versa is also possible (entrainment function). This will be explained in more detail below. The limited rotational free travel may have a rotation angle of 40° to 60°, and in particular of approximately 50°.

It would normally be necessary to provide a freewheeling element or the like for realizing such a rotational free travel. However, the shift device according to the invention already has rotational free travel, without requiring additional components. According to the invention, the rotational free travel or the free travel function is attained only by way of a clever design of the spline connection. In summary and stated differently, the invention produces inter alia a free travel function, without adding complexity and costs.

Advantageously, the spline connection includes an inner spline formed on the shift lever and an outer spline formed on the shift shaft, wherein the inner spline is based on a circular cylindrical contour and has a plurality of radially inwardly directed and mutually circumferentially spaced teeth, and wherein the outer spline is also based on a circular cylindrical contour and has a plurality of radially outwardly directed and also mutually circumferentially spaced teeth. The inwardly directed or the radially inwardly directed teeth or inner spline elements of the inner spline and the radially outwardly directed or the radially outwardly directed teeth or outer spline elements of the outer spline form of corresponding spline elements which overlap in the radial direction. The limited rotational free travel is possible due to the gaps between the teeth or tooth elements. The gaps may also be referred to as the tooth gaps in the circumferential direction.

In a particularly preferred embodiment, the teeth of this inner spline and of this outer spline are circumferentially arranged at uniform intervals. The inner spline and the outer spline may each have 4 to 8 teeth, preferably 5 to 7 teeth, and in particular 6 teeth.

The shift device according to the invention may also have a shift sensor (PRND sensor) which is connected to the shift shaft in a rotationally fixed relationship. Advantageously, the shift shaft and the shift sensor may be connected to each other by a spline connection, wherein the spline connection has an inner spline formed on the shift sensor and an outer spline formed on the shift shaft, wherein the inner spline is based on a circular cylindrical contour and has a plurality of radially outwardly directed and mutually circumferentially spaced notches, and wherein the outer spline is also based on a circular cylindrical contour and has a plurality of radially outwardly directed and likewise mutually circumferentially spaced teeth. The teeth of the outer spline and the notches of the inner spline are formed in such a manner that they can positively mesh with one another without rotational play.

In particular, the shift lever may be connected to the shift shaft by way of the same aforedescribed outer splines on the shift shaft. In other words, the shift lever may be connected with the shift shaft with rotational play and the shift sensor may likewise be connected with the shift shaft without rotational play by way of the same outer spline or by way of the same outer spline section disposed on the shift shaft.

Advantageously, a precise angular alignment between the shift sensor and the shift shaft is attained by way of a double tooth formed on the outer spline and a double notch formed on the inner spline. The double tooth and the double notch can positively interlock and thus bring about a precise angular alignment of the shift sensor on the shift shaft. The rotational free travel between the shift lever and the shift shaft is thereby not impaired.

According to the other independent claim, the object is also attained with a motor vehicle transmission, in particular an automatic transmission of a motor vehicle that includes or has at least one shift device according to the invention.

Preferably, the motor vehicle transmission or the automatic transmission of a motor vehicle is a transmission of a passenger car. Furthermore, the motor vehicle transmission or the automatic transmission of a vehicle is preferably a shift-by-wire transmission. In a shift-by-wire transmission, gears are shifted by electrical switching commands that are processed by a control unit, which then performs the mechanical shifting processes by way of servomotors and the like.

An exemplary embodiment of the invention will now be described in more detail with reference to the figures.

Additional features and advantages can be inferred from this description. Specific features of this exemplary embodiment may represent general features of the invention. Features of this exemplary embodiment associated with other features may also represent individual features of the invention.

BRIEF DESCRIPTION OF THE DRAWING

It is shown schematically and by way of example in:

FIG. 2 the shift lever associated with the shift device of FIG. 1 in an axial plan view;

FIG. 3 the shift sensor associated with the shift device of FIG. 1 in an axial plan view;

FIG. 4 the front axial end of the shift shaft associated with the shift device of FIG. 1 in a perspective view; and FIG. 5 the shift lever of FIG. 2 connected to the shift shaft of FIG. 4 via a spline connection in an axial plan view.

DETAILED DESCRIPTION OF PREFERRED EMBODIMENTS

Figure 1:
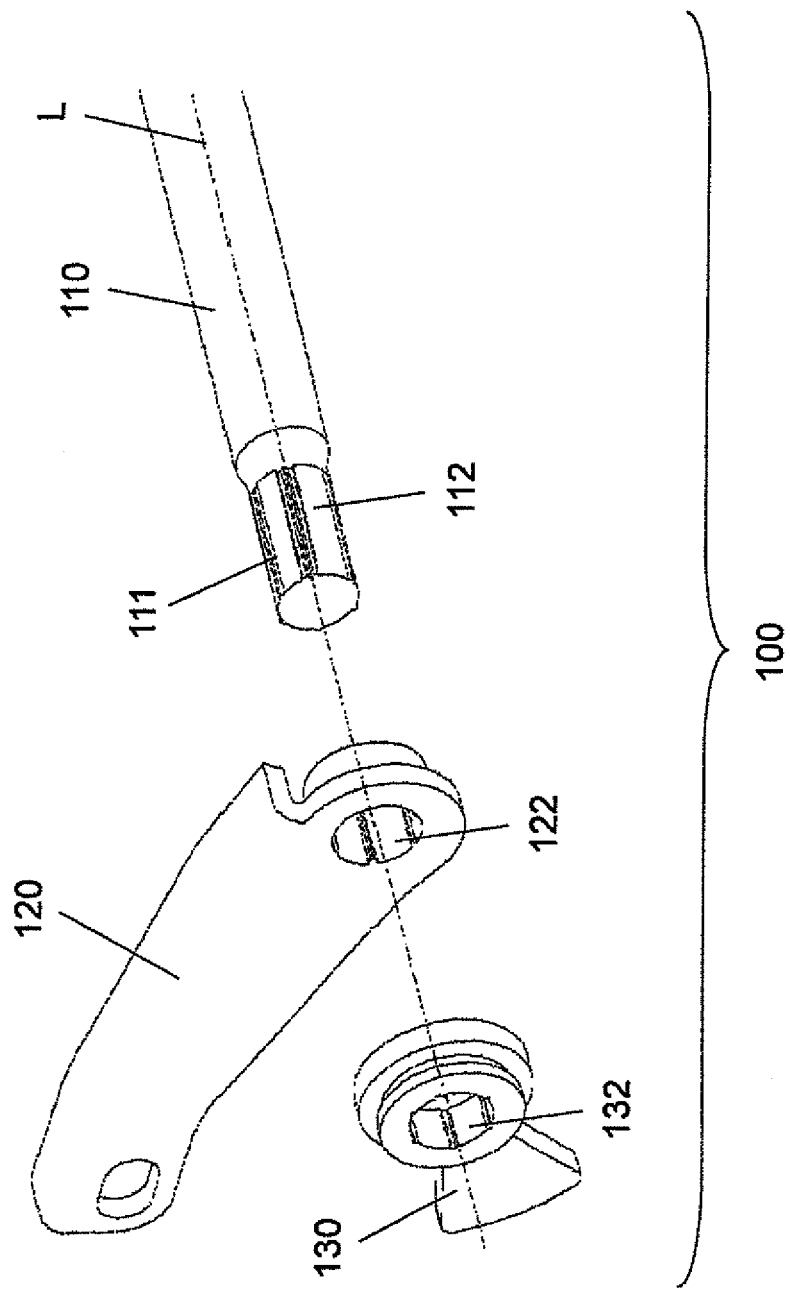
FIG. 1 a shift device according to the invention in an exploded perspective view.

FIG. 1 shows a shift device according to the invention generally designated with 100. The shift device 100 includes a shift shaft 110, a shift lever 120 and a shift sensor or shift position sensor 130, respectively. The exemplary one-piece components 110, 120 and 130 are for illustrative purposes shown separately by pulling them apart along the common rotation or swivel axis L.

The shift lever 120 and the shift sensor 130 can be connected to the shift shaft 110, for which purpose the shift shaft 110 is pushed in the direction of the axis L onto the front axial end 11 of the shift shaft 110 (which is in particular the axial end facing away from the transmission of the motor vehicle). The connection is established by way of a spline connection, wherein the front axial end 111 of the shift shaft 110 is formed with an outer spline or an outer spline section 112, as will be explained in more detail below. Correspondingly, the shift lever 120 is formed with an inner spline 122 and the shift sensor 130 is formed with an inner spline 132. The inner splines 122 and 132 of the shift lever 120 and the shift sensor 130 are constructed differently, as will be explained in more detail below with reference to FIGS. 2 and 3.

FIG. 2 shows the shift lever 120 in a plan view along the axis L. The shift lever 120 has a circular cylindrical bore 121. The bore 121 is formed with an inner spline or an inner spline section 122, respectively. The inner spline 122 has a plurality of teeth 123, which are radially inwardly directed starting from the inner wall of the bore or the bore contour and have a mutual spacing in the circumferential direction. In the illustrated exemplary embodiment, six teeth 123 are provided which are arranged with a uniform distribution in circumferential direction on the inner wall of the bore.

FIG. 3 shows the shift sensor 130 in a plan view along the axis L. The shift sensor 130 has a circular cylindrical bore 131. The bore 131 is also formed with an inner spline or an inner spline section 132. Unlike the inner spline 122 of the shift lever 120, the inner spline 132 of the shift sensor 130 has several notches 133 which are directed radially outwardly, starting from the inner wall of the bore or the bore contour and are circumferentially spaced from one another. In the illustrated embodiment, six grooves 133 are provided, which are arranged on the inner wall of the bore with a uniform distribution in the circumferential direction. Furthermore, a double notch 133a/133b is provided for arranging and/or connecting the shift sensor 130 on the shift shaft 110 at a precise angle.

FIG. 4 shows the front axial end 111 of the shift shaft 110. The shift shaft 110 is formed in this end portion with an outer spline or an outer spline section 112. The outer spline 112 has a plurality of teeth 113, which are directed radially outwardly, starting from a circular cylindrical surface, and are spaced relative to each other in the circumferential direction. In the illustrated exemplary embodiment, six teeth 113 are provided, which are uniformly distributed in the circumferential direction on the outer surface of the axial end portion 111. Furthermore, a double tooth 113a/113b is provided for arranging and/or connecting the shift sensor 130 on the shift shaft 110 at a precise angle.

The shift sensor 130 is connected with the shift shaft 110 in a rotationally fixed arrangement due to the positive engagement of the teeth 113 associated with the outer spline 112 of the shift shaft 110 with the notches 133 associated with the inner spline 132 of the shift sensor 130, thereby forming a play-free spline connection. The engagement between the double tooth 113a/113b on the shift shaft 113a/113b in the double notch 133a/133b on the shift sensor 130 results in an angularly precise alignment of the shift sensor 130 on the shift shaft 110.

The shift lever 120 is also connected with the shift shaft 110 by a spline connection; however, this spline connection has rotational play, thereby allowing a limited rotational free travel of the shift shaft 110 relative to the shift lever 120 and/or vice versa. This will be explained below with reference to FIG. 5.

FIG. 5 shows in an axial top view (view along the axis L) the shift lever 120 connected with the shift shaft 110 by way of a spline connection. The spline connection is realized by the positive engagement of the outer spline 112 disposed on the shift shaft 110 and the existing inner spline 122 disposed on the shift lever 120, wherein the teeth 113 and 123 overlap in the radial direction. The tooth heights of the respective teeth 113 and 123 are matched.

As already explained above, both the radially outwardly directed teeth 113 of the shift shaft 110 and the radially inwardly directed teeth 123 on the shift lever 120 have a mutual spacing in the circumferential direction. The gaps between the teeth formed in this way allow limited rotational free travel between the shift shaft 110 and the shift lever 120.

In the diagram shown in FIG. 5, the teeth 113 of the shift shaft 110 are in physical contact with the teeth 123 of the shift lever 120. This illustrated condition can be caused, for example, by applying a spring force to the shift shaft 110. On the one hand, torques can then be transmitted between the shift shaft 110 and the shift lever 120 in one direction. On the other hand, the shift shaft 110 can rotate counterclockwise about the rotation angle or pivot angle a from the illustrated position when the shift lever 120 is stationary, until the teeth 113 the shift shaft 110 contact the adjacent teeth 123 of the shift lever 120 in the direction of rotation of (wherein all the teeth touch simultaneously or at the same time in direct contact). Torques can then be transmitted between the shift shaft 110 and the shift lever 120 in the respective other direction. In a similar way, the shift shaft 110 can return to the illustrated position when the shift lever 120 is stationary.

The spline connection existing between the shift shaft 110 and the shift lever 120 has thus both an entrainment function as well as a restricted or limited free travel function that allows rotational free travel for the shift shaft 110 within the rotation angle a when the shift lever 120 is stationary.

(Similarly, the rotational free travel may of course also be used for pivoting the shift lever 120 when the shift shaft 110 is stationary.) The rotation angle a can be structurally specified by the number circumferentially spaced teeth 113 or 123 and/or by the tooth width. The angle of rotation a is dimensioned so as to be adequate for the aforementioned operating conditions (where a relative rotational movement between the shift shaft 110 and the shift lever 120, and in particular a rotation of the shift shaft 110, is required when the shift lever 120 is stationary). In the illustrated example, the rotational angle a is approximately 50°. The teeth 113 and 123 have narrow dimensions along the circumference.

Accordingly, both a rotationally fixed connection with the shift sensor 130 and a connection with the shift lever 120 having rotational free travel can be realized with one and the same outer spline 112 on the shift shaft 110, without the need for additional components (e.g. keys, pins, overrunning clutches, etc.). The external spline section 112 on the shift shaft 110 is formed with a corresponding axial length.

The invention claimed is:

1. A shift device for a transmission of a motor vehicle, comprising:
 a shift shaft operatively connected to the transmission,
 a shift lever for actuating the shift shaft, wherein the shift lever is connected to the shift shaft by a first spline connection having rotational play, thereby enabling limited rotational free travel of the shift shaft when the shift lever is in a fixed position,
 a shift sensor connected to the shift shaft in a rotationally fixed arrangement by way of a second spline connection, wherein the second spline connection comprises an inner spline formed on the shift sensor and having a circular cylindrical contour and a plurality of radially outwardly directed and mutually circumferentially spaced notches, and an outer spline formed on the shift shaft and having a circular cylindrical contour and a plurality of radially outwardly directed and mutually circumferentially spaced teeth, and
 a double tooth formed on the outer spline and a double notch formed on the inner spline, with the double tooth and the double notch defining a precise angular alignment between the shift sensor and the shift shaft.

2. The shift device of claim 1, wherein the transmission is an automatic transmission of a motor vehicle.

3. The shift device of claim 1, wherein the limited rotational free travel has an angle of rotation of between 40° and 60°.

4. The shift device of claim 1, wherein the first spline connection comprises an inner spline formed on the shift lever and having a circular cylindrical contour and a plurality of radially inwardly directed, mutually circumferentially spaced teeth, and an outer spline formed on the shift shaft and having a plurality of radially outwardly directed and mutually circumferentially spaced teeth.

5. The shift device of claim 4, wherein the teeth of the outer spline and the teeth of the inner spline are spaced apart in the circumferential direction by uniform gaps.

6. The shift device of claim 4, wherein the outer spline and the inner spline have each between 4 and 8 teeth.

7. The shift device of claim 6, wherein the outer spline and the inner spline have each 6 teeth.

8. A transmission of a motor vehicle, comprising a shift device with a shift shaft operatively connected to the transmission, and a shift lever for actuating the shift shaft, wherein the shift lever is connected to the shift shaft by a first spline connection having rotational play, thereby enabling limited rotational free travel of the shift shaft when the shift lever is in a fixed position,
 a shift sensor connected to the shift shaft in a rotationally fixed arrangement by way of a second spline connection, wherein the second spline connection comprises an inner spline formed on the shift sensor and having a circular cylindrical contour and a plurality of radially outwardly directed and mutually circumferentially spaced notches, and an outer spline formed on the shift shaft and having a circular cylindrical contour and a plurality of radially outwardly directed and mutually circumferentially spaced teeth, and
 a double tooth formed on the outer spline and a double notch formed on the inner spline, with the double tooth and the double notch defining a precise angular alignment between the shift sensor and the shift shaft.

9. The transmission of claim 8, wherein the transmission is an automatic transmission of a motor vehicle.

10. The transmission of claim 8, wherein the transmission is a shift-by-wire transmission.

11. The transmission of claim 8, wherein the first spline connection comprises an inner spline formed on the shift lever and having a circular cylindrical contour and a plurality of radially inwardly directed, mutually circumferentially spaced teeth, and an outer spline formed on the shift shaft and having a plurality of radially outwardly directed and mutually circumferentially spaced teeth.

\* \* \* \* \*